(12) United States Patent
Sartenaer et al.

(10) Patent No.: US 11,097,515 B2
(45) Date of Patent: Aug. 24, 2021

(54) LAMINATED GLAZING

(71) Applicant: AGC GLASS EUROPE, Louvain-la-Neuve (BE)

(72) Inventors: Yannick Sartenaer, Vedrin (BE); Giovanni Occhionorelli, Gosselies (BE); Denis Legrand, Wargnies (FR); Marek Latner, Teplice (CZ); Maxime Collignon, Gottignies (BE)

(73) Assignee: AGC GLASS EUROPE, Louvain-la-Neuve (BE)

( * ) Notice: Subject to any disclaimer, the term of this patent is extended or adjusted under 35 U.S.C. 154(b) by 0 days.

(21) Appl. No.: 16/470,776

(22) PCT Filed: Dec. 20, 2017

(86) PCT No.: PCT/EP2017/083755
§ 371 (c)(1),
(2) Date: Jun. 18, 2019

(87) PCT Pub. No.: WO2018/115090
PCT Pub. Date: Jun. 28, 2018

(65) Prior Publication Data
US 2019/0337269 A1    Nov. 7, 2019

(30) Foreign Application Priority Data
Dec. 21, 2016    (EP) .................................... 16205589

(51) Int. Cl.
*B32B 3/00*     (2006.01)
*B32B 17/10*    (2006.01)
(Continued)

(52) U.S. Cl.
CPC .......... *B32B 17/10357* (2013.01); *B32B 7/12* (2013.01); *B32B 17/10036* (2013.01);
(Continued)

(58) Field of Classification Search
None
See application file for complete search history.

(56) References Cited

U.S. PATENT DOCUMENTS 10,773,496 B2 * 9/2020 Aoki ......................... B32B 7/12
2004/0160688 A1   8/2004 Noguchi et al.
(Continued)

FOREIGN PATENT DOCUMENTS

DE         100 09 992 A1    9/2001
DE    10 2007 042 028 A1    3/2009
(Continued)

OTHER PUBLICATIONS

International Search Repot dated May 11, 2018 in PCT/EP2017/083755 filed Dec. 20, 2017.

*Primary Examiner* — Seth Dumbris
(74) *Attorney, Agent, or Firm* — Oblon, McClelland, Maier & Neustadt, L.L.P.

(57) ABSTRACT

A laminated glazing including a first glass sheet and a second glass sheet laminated via at least one thermoplastic interlayer, and an optical sensor arranged on the inner face of the laminated glazing. The thermoplastic interlayer includes a zone that is opaque to visible wavelengths and that extends at least in the zone surrounding the optical sensor.

16 Claims, 3 Drawing Sheets

(51) Int. Cl.
*B32B 7/12* (2006.01)
*B60J 1/02* (2006.01)
*E06B 3/66* (2006.01)

(52) U.S. Cl.
CPC .. *B32B 17/10761* (2013.01); *B32B 17/10788* (2013.01); *B60J 1/02* (2013.01); *E06B 3/66* (2013.01); *B32B 2250/03* (2013.01); *B32B 2250/40* (2013.01); *B32B 2307/41* (2013.01); *B32B 2605/006* (2013.01); *Y10T 428/24917* (2015.01); *Y10T 428/24926* (2015.01)

(56) References Cited

U.S. PATENT DOCUMENTS

| | | | |
|---|---|---|---|
| 2006/0250711 | A1 | 11/2006 | Noguchi et al. |
| 2011/0027515 | A1 | 2/2011 | Melcher et al. |
| 2016/0243796 | A1* | 8/2016 | Mannheim Astete ............... B32B 17/1077 |
| 2017/0015180 | A1* | 1/2017 | Sakamoto ................ B60J 1/02 |
| 2018/0037094 | A1 | 2/2018 | Legrand |

FOREIGN PATENT DOCUMENTS

| | | |
|---|---|---|
| DE | 10 2008 000 685 A1 | 9/2009 |
| EP | 1 464 632 A1 | 10/2004 |
| EP | 3 034 296 A1 | 6/2016 |
| WO | WO-0234686 A1 * | 5/2002 ........... C03C 17/001 |

\* cited by examiner

LAMINATED GLAZING

The invention relates to glazings comprising patterns which limit light transmission. More particularly, the invention relates to glazings comprising patterns which limit light transmission and an optical sensor, such as, for example, a camera, an infrared camera, a Lidar, a laser pointer, and the like. A large part of motor vehicle glazings comprise enameled patterns intended to conceal unsightly elements, in particular glue seals, electrical connections and in particular those connected to a possible camera positioned on the glazing, and the like. Conventionally, these patterns are obtained by application of a composition comprising a glass frit, pigments and a vector in which the frit and the pigments are suspended. The application of these enamel compositions is followed by a high-temperature firing which melts the frit and attaches the enamel to the support.

While a large part of motor vehicle glazings comprise patterns of this type, architectural glazings or glazings having an industrial use can also exhibit such patterns which very greatly limit light transmission. For this reason, even if the invention is first intended for application to motor vehicle glazings, it also relates to the other types of glazings and generally to all applications of patterns to glass sheets, in particular when these glazings exhibit constraints in their composition or in their use, in particular as regards heat treatments or capturing of images.

For simplicity, the continuation of the description refers essentially to motor vehicle glazings, it being understood that this does not limit the subject matter of the invention.

Most commonly, the application of the enameled patterns to the glass is carried out by a screen printing technique. The composition applied is dried, in order to remove the greater part of the vector, and subjected to a firing intended to attach the constituents to the glass sheet. The firing of the enamel composition can be carried out during a treatment for forming the sheet. The temperature conditions under which the forming occurs, whether it is a tempering or a bending, are such that the melting point of the frit is greatly exceeded.

One difficulty is to prevent the molten composition from adhering to the objects in contact with the sheet during this operation. In particular, in the bending of assemblies comprising two identical sheets intended to constitute a laminated glazing, it is necessary to take precautions in order for the enamel composition not to be transferred from one sheet to the other.

Furthermore, the presence of the enamel composition on a glass sheet leads to various difficulties in the implementation of these bending/tempering operations, by locally modifying the thermal behavior of the sheet. This is because the presence of the enamel is reflected by a substantial difference in absorption of the thermal radiation, leading locally to differences in the forming kinetics. These differences, if they are not taken into account in the treatment conditions, lead to irregularities in the forming.

The difficulties of the type of those indicated above are well known. Solutions also known make it possible to overcome these difficulties more conveniently the less complex the form imposed on the sheets. For very complex forms, it is generally necessary to form the sheets by means of a partial pressing which necessarily results in contact with the enameled parts.

For simplicity, the numbering of the glass sheets in the continuation of the description refers to the numbering nomenclature conventionally used for glazings. Thus, the face of the laminate which is in contact with the environment external to the vehicle is known as being the face 1 and the surface in contact with the internal medium, that is to say the passenger compartment of the vehicle, is called face 4.

In order to avoid any doubt, the terms "external" and "internal" refer to the orientation of the glazing during the installation as glazing in a vehicle.

Furthermore, during use of an optical sensor, such as, for example, a camera, an infrared camera, a Lidar or a laser pointer, conventionally positioned close to the interior rear-view mirror, a distortion of the image captured by the optical sensor, and in particular the camera, is brought about by the presence of enamel around the zone commonly known under the name "camera zone". It is understood that the optical sensor can be positioned in another zone than that close to the rear-view mirror. This is because the optical sensor might be positioned, for example, in a zone at the periphery of the glazing or in any other zone capable of receiving such a sensor.

In order to avoid these difficulties and to meet the requirements of concealing, the invention provides glazings and in particular laminated glazings comprising a thermoplastic interlayer comprising a zone which is opaque to radiation of the wavelengths of the visible region. In particular, the invention consists in replacing the screen printing normally used on at least the face 2 or the face 4 in order to conceal the edge of the glazings with a thermoplastic interlayer film comprising a zone which is opaque to radiation of the wavelengths of the visible region and to ultraviolet (UV) radiation. The use of this thermoplastic interlayer comprising a zone which is opaque to radiation of the lengths of the visible region and to ultraviolet (UV) radiation and thus devoid of frit does not require a "firing" at a relatively high temperature, such as that reached with enamel compositions.

More particularly, the present invention provides a laminated glazing and in particular a laminated glazing comprising a thermoplastic interlayer comprising a zone which is opaque to radiation of the wavelengths of the visible region and to ultraviolet (UV) radiation and an optical sensor, in particular a camera, attached to the internal face of the laminated glazing.

Conventionally, laminated glazings for a motor vehicle are printed over the entire periphery of the edges of the glazing and in the zone of incorporation of the sensors on face 2 and/or face 4, in order to form an occultation strip, in order, on the one hand, to protect, from UV radiation, the gluing system which makes it possible to guarantee the adhesion of the added elements to the glazing, such as the busbars, connectors, heating arrays, brackets, and the like, and, on the other hand, to conceal these elements and also to conceal the cameras, the other optical detectors, such as rain detectors, and the like.

Thus, the aim of the strip is twofold: on the one hand, esthetics, as, from the outside, none of these elements is visible, and, on the other hand, to prevent damage to the glue brought about by exposure to solar radiation.

Generally, the printing used is enamel screen printing. This is because the enamel makes it possible to provide the required optical qualities and sufficient concealment of the elements, such as those mentioned above.

However, screen printing on glass sheets is not without disadvantages. In a laminate, the enamel is screen printed on the internal face of the glass sheet intended for the external position, that is to say in contact with the atmosphere, known as face 2, and/or on the external face of the glass sheet intended for the internal position, known as face 4, which is in contact with the internal atmosphere, in particular of the passenger compartment of a vehicle.

Furthermore, the solutions of the prior art require the provision of plants for the prefiring of this enamel intended for the face 2. These plants thus represent a cost related to the capital cost of the equipment, to the upkeep, to the energy consumption, to the maintenance, and the like.

Furthermore, the presence of enamel strips on the faces 2 and 4 is not without effect on the behavior of the glass during its bending as these strips cause the glass to absorb infrared (IR) radiation, locally over the periphery of the glazing, whereas the internal surface of the glass will only slightly absorb it; this is all the truer for windshields, for which the glass sheets are generally clear glasses; this is all the truer still when reflecting layers are used. In this implementation, highly absorbing zones come into contact with highly reflecting zones.

This results in a glass defect known as "burn line", which is a local deformation related to these two phenomena and parallel to the black enamel strips; they are stronger as the black strips are wider. This is the reason why these burn lines are essentially visible as a top and bottom strip of the windshields, that is to say the lower zone and upper zone of the windshield. The lateral black strips are generally thin, so as to maximize the field of view.

This "burn line" is all the more troublesome when a camera, today commonly used in modern vehicles, is positioned on face 4 of the windshield. This is because the image captured by a camera positioned on face 4 of a conventional windshield comprising enamel as concealing element exhibits a distortion which may be damaging during the analysis of the images received. This is all the more important in vehicles known as "intelligent vehicles" in which the images captured by the camera or cameras allow the vehicle to react to an obstacle or an imminent danger.

In order to reduce to a minimum these optical defects, it is known to add, to the bending equipment, thermal masses which will, as far as possible, absorb the heat captured by the zones of the glass locally overheated by the presences of the black strips.

These masses also have an impact on the consumption energy balance of the furnace and also on the cycle times, depending on the complexity of the products to be bent.

Thus, the presence of enamel strips impacts not only the process but also the optical quality of the products and the images caught by possibly a camera positioned on the face 4 of a laminated glazing.

Thus, the present invention provides a solution which makes it possible to significantly reduce, indeed even to eliminate, the optical distortion of the image captured by the optical sensor and in particular the camera positioned on the face 4 of the laminated glazing.

According to the invention, the thermoplastic interlayer comprising a zone which is opaque to radiation of the wavelengths of the visible region is advantageously positioned between the faces 2 and 3 of the laminated glazing during the assembling operations comprising a passage through the oven and under pressure (also known as lamination).

According to a specific implementation of the invention, the thermoplastic interlayer comprising a zone which is opaque to radiation of the wavelengths of the visible region is advantageously applied to the face 2 of the laminated glazing at least in the zone referred to as "camera zone", that is to say the zone around the optical sensor, such as a camera, a Lidar, and the like. It is understood that the same zone where the optical sensor or more particularly the sensor of the camera or cameras is positioned is devoid of the thermoplastic interlayer comprising a zone which is opaque to radiation of the wavelengths of the visible region during the assembling operations comprising a passage through the oven and under pressure (also known as lamination), as for the conventional windshields where the enamel replaces the thermoplastic interlayer.

Zone which is opaque to radiation of the wavelengths of the visible region is understood to mean a zone, the light transmission of which is less than 5% and preferably equal to 0% of the incident light. This opaque zone, contrary to the enamel, makes it possible both to conceal elements, such as connections (busbars, and the like), the glue, and the like, as would be done by the enamel, but especially simplifies the process of formation of a laminated glazing comprising elements which have to be concealed, as well from the outside as from the inside of the passenger compartment.

For the sake of simplicity, in the remainder of the description, the term "the opaque zone" will refer to the zone which is opaque to radiation of the wavelengths of the visible region.

The appearance of the opaque zone has to be strictly homogeneous when it is a coating the purpose of which is first esthetic. For the same reasons, the opaque zone has to have very precise outlines, despite the difficulty resulting from the nature of the support.

As emerges from the preceding indications, the use of a thermoplastic interlayer comprising an opaque zone constitutes a characteristic of the invention which distinguishes it from the enamels normally employed.

For the opaque zone used on the glazings in order to hide the underlying elements, the opaqueness required is such that the light transmission is less than 5% and preferably less than 3% and more preferably still equal to 0%.

The aim of the invention is thus to make available a laminated glazing comprising a thermoplastic interlayer comprising a zone which is opaque to radiation of the wavelengths of the visible region which makes it possible to conceal unsightly elements and to improve the quality of the images captured by virtue of an optical sensor and in particular a camera positioned on face 4 of the laminated glazing, since the optical distortion in the "camera zone" is significantly reduced, indeed even eliminated.

This aim is achieved by the invention, a subject matter of which is a laminated glazing comprising a first glass sheet and a second glass sheet assembled (laminated) by means of at least one thermoplastic interlayer.

According to the invention, the laminated glazing comprises the at least one thermoplastic interlayer comprising a zone which is opaque to the wavelengths of the visible region.

According to a preferred embodiment of the invention, said opaque zone extends over the whole of the periphery of the glass sheet to which it is applied and also into the "camera zone" or into any zone in which a good optical quality is necessary, just as for the enamel layer in a conventional glazing. This opaque zone thus substitutes for the enamel conventionally used.

According to a specific embodiment of the invention, the opaque zone can extend over a wide portion of the laminated glazing.

According to a preferred embodiment of the invention, said opaque zone extends over the whole of the periphery of the internal face of the external glass sheet, that is to say on face 2.

Thus, by virtue of the invention, the process for concealing the unsightly elements is simplified and can be carried out during the process of assembling (of laminating) the laminated glazing.

According to a preferred embodiment of the invention, the thermoplastic interlayer comprising an opaque zone is formed from an opaque frame positioned around the nonopaque zone.

According to a specific embodiment of the invention, a thermoplastic interlayer opaque in its entirety and of a size making possible the lamination of the glass sheets together can be emptied of its central part in order to form a frame. The central part is then replaced with a nonopaque or transparent thermoplastic interlayer. These two parts, during the lamination process, will fuse so as to form a single part. Advantageously, the frame is formed of juxtaposed strips of opaque interlayer, for example a PVB or an EVA, tinted black throughout, the strips being positioned around a central part of a thermoplastic interlayer; the parts will fuse together so as to form the thermoplastic interlayer which will extend over the entire surface of the glass sheets.

The at least one thermoplastic interlayer can be of any material known in the art capable of forming a laminate. It can be an ethylene/vinyl acetate copolymer, polyurethane, polycarbonate, polyvinyl butyral, polyvinyl chloride or a copolymer of ethylene and of methacrylic acid. According to a preferred embodiment of the invention, the thermoplastic interlayer comprising a zone which is opaque to radiation of the wavelengths of the visible region is a sheet of polyvinyl butyral (PVB) or of ethylene/vinyl acetate (EVA).

It is generally available in a thickness of between 0.38 and 1.1 mm but most often of 0.76 mm.

According to a preferred embodiment of the invention, the thermoplastic interlayer comprising an opaque zone is obtained by bulk coloring of the periphery of the interlayer.

According to a preferred embodiment of the invention, the thermoplastic interlayer comprising an opaque zone is obtained by juxtaposition of an opaque colored thermoplastic interlayer frame and of a central part formed of a transparent or nonopaque interlayer, it being possible for the opaque frame and the central part of the thermoplastic interlayer to be in an identical or different thermoplastic material, one being colored and the other uncolored.

According to a specific embodiment of the invention, the dimensions of the opaque zone are similar to those normally used for an enamel layer. It is understood that they can be greater or smaller than those of the enamel layer, the aim being for the opaque zone to be sufficiently wide to conceal the elements glued to the glazing, such as busbars, connections, and the like.

According to a specific embodiment of the invention, the thermoplastic interlayer comprising a zone which is opaque to radiation of the lengths of the visible region according to the invention is positioned substantially on the surface of the glazing.

According to a specific and advantageous embodiment of the invention, the thermoplastic interlayer comprising a zone which is opaque to radiation of the lengths of the visible region is positioned around the camera zone, thus reducing the optical distortion in this zone.

Advantageously, the laminated glazing additionally comprises a second thermoplastic interlayer. Preferably, the second thermoplastic interlayer is a sheet of polyvinyl butyral (PVB).

According to an advantageous embodiment of the invention, additional thermoplastic interlayers can be positioned between the thermoplastic interlayer comprising an opaque zone and the second glass sheet. In this specific embodiment of the invention, the thermoplastic interlayers are chosen from a copolymer of polyvinyl butyral or of ethylene/vinyl acetate, or of polyurethane, or of polycarbonate.

According to a specific embodiment of the invention, only the lower and upper peripheral zones of the glazing or only the camera zone are covered with the opaque zone of the thermoplastic interlayer, while the lateral (right-left) zones of the laminated glazing are provided with an enamel layer.

Furthermore, the choice of the interlayers may be dictated by the need to minimize excessive exposure of the glazing to UV radiation. The choice of the interlayers makes it possible to considerably restrict this exposure. This is the case in particular of the use of PVB interlayers, which by nature screen out UV radiation, allowing only a very small proportion of the latter to pass. For PVB films with a thickness of 0.38 mm, more than 95% of the UV radiation is eliminated. This proportion can exceed 99%. Polymers based on ethylene/vinyl acetate (EVA) are also proposed which include components conferring on them a very low transmission of UV radiation.

Advantageously, the at least thermoplastic interlayer according to the invention comprises a nonopaque zone which is formed from a thermoplastic interlayer which screens out UV radiation, also known as "UV-cut".

In order to achieve certain light transmission values, at least one of the glass sheets used in the laminated glazing can be colored. The glazing can also include colored interlayers which contribute to the establishment of the desired optical conditions.

Thus, colored thermoplastic interlayers can be superposed so as to obtain a specific color and/or specific optical conditions.

According to a specific embodiment of the invention, the nonopaque part of the interlayer comprising an opaque zone is formed by juxtaposition of pieces of colored thermoplastic interlayers, so as to obtain, for example, a shading of colors or specific patterns.

Moreover, a subject matter of the invention is a process for manufacturing a laminated glazing as described above.

The advantages of this process are the same as those of the devices; they are not described more fully in detail.

The invention also relates to the use of at least one thermoplastic interlayer comprising a zone which is opaque to radiation of the wavelengths of the visible region, for concealing unsightly elements comprised between two glass sheets.

For a better understanding, the present invention will now be described in more detail by way of nonlimiting example, with reference to the following figures, in which:

FIG. 1 shows a schematic plan view of a known glazing 10 of the prior art comprising an enamel layer on faces 2 and 4.

Figure 1:
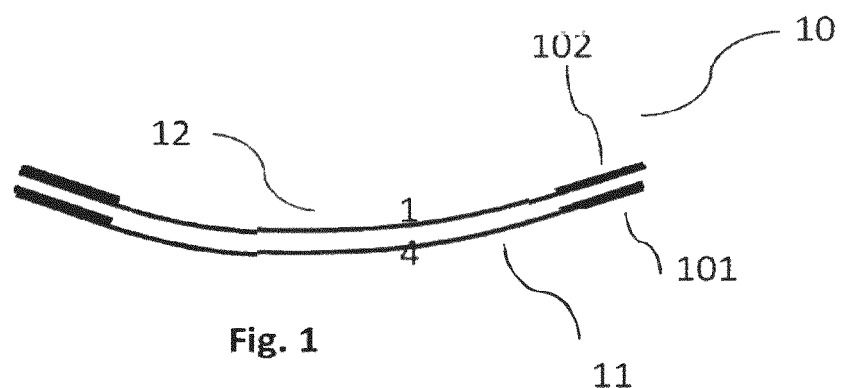

FIG. 1 shows a known laminated glazing of the prior art, in the form of a windshield for a motor vehicle 10. Around the periphery of the windshield for a motor vehicle 10 is positioned, on faces 2 and 4, an occultation strip 101 and 102, more specifically an enamel layer, the role of which is, on the one hand, to conceal and protect the tightness material (not represented) which is used to attach the window in a vehicle (not represented) and, on the other hand, to conceal the electrical connections (busbars, and the like) which provide electrical energy to the glazing, if need be. The face of the laminate which is in contact with the environment external to the vehicle is known as being the face 1 and the surface in contact with the internal medium, that is to say the passenger compartment of the vehicle, is known as face 4. Thus, the faces of the glass sheets are numbered from 1 to 4 in the figures. In practice, windshields exhibit curvatures which are ordinarily more accentuated at the edges in the place where they are joined to the body for a fit chosen for its design, the aerodynamics corresponding to a good surface continuity between the contiguous elements.

The presence of enamel strips on the faces 2 and 4 is not without effect on the behavior of the glass during its bending as these strips cause the glass to absorb infrared (IR) radiation, locally over the periphery of the glazing, whereas the internal surface of the glass will only slightly absorb it; this is all the truer for windshields, for which the glass sheets are generally clear glasses; this is all the truer still when reflecting layers are used. In this implementation, highly absorbing zones come into contact with highly reflecting zones.

This results in a defect of the glass known as "burn line", which is a local deformation related to these two phenomena and parallel to the black enamel strips; they are stronger as the black strips are wider. This is the reason why these "burn lines" are essentially visible as top and bottom strips of the windshields. The lateral black strips are always thin (field of view to be maximized).

Figure 5:
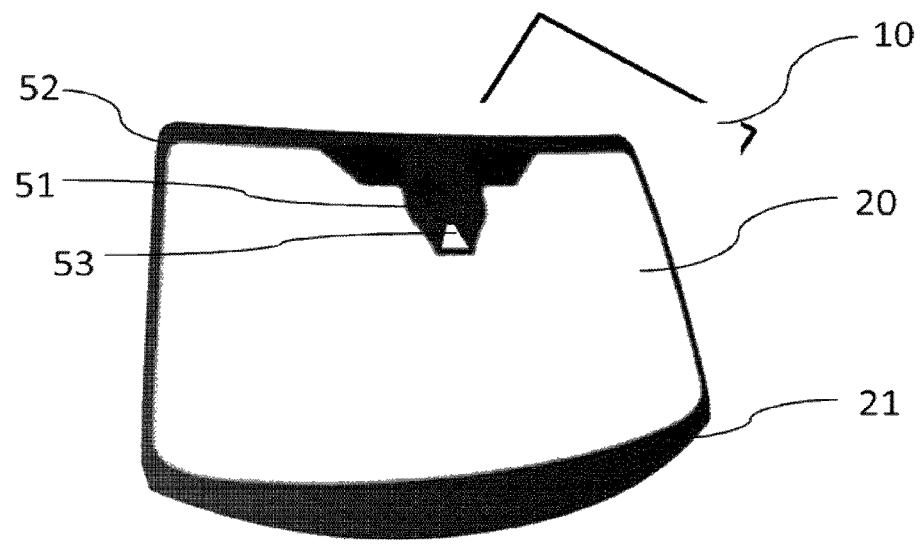
FIG. 5 shows a schematic plan view of a glazing 10 according to the invention comprising a thermoplastic interlayer comprising a zone which is opaque to radiation of the wavelengths of the visible region which extends into the "camera zone".

According to the invention and as shown in FIG. 5, the opaque zone 21 of the thermoplastic interlayer 20 extends at least into the "camera zone" 51 (or 52 in an alternative form of incorporation of the optical sensors) so as to improve the quality of the images captured by the camera or cameras positioned in front of the laminated glazing by reducing the optical distortion in this zone. The camera, or generally the optical sensor, (not shown) is placed in the stack 53.

The glass sheets 11 and 12 as illustrated in FIGS. 1 to 6 are glasses of soda-lime-silica type. One or both glass sheets can be sheets of clear glass of soda-lime-silica type with the following composition (by weight): $SiO_2$ 68-75%; $Al_2O_3$ at 0-5%; $Na_2O$ 10-18%; $K_2O$ at 0-5%; MgO 0-10%; CaO 5-15%; $SO_3$ 0-2%. The glass can also contain other additives, such as, for example, refining adjuvants, in an amount ranging up to 2%.

According to a specific embodiment of the invention, the internal glass sheet of the laminated glazing can be made of glass tinted throughout, the composition of which can comprise one or more of the following colorants: iron oxide, cobalt oxide, selenium, chromium oxide, titanium oxide, manganese oxide, copper oxide, vanadium oxide or nickel oxide. It is understood that the two glass sheets can be made of clear glass. One or the glass sheets can be made of tempered glass. The glass sheets can be flat or curved. Each glass sheet can have a thickness of between 0.5 and 25 mm in thickness, preferably between 1 and 5 mm. The total thickness of the motor vehicle glazing can thus be between 1.5 and 100 mm, preferably between 2 and 50 mm and more preferably between 2.5 and 20 mm. Preferably, the glazing has a transmission of visible light (measured with the illuminant CIE A) of greater than 70% and more preferably of greater than 75% when the two glass sheets and the layers of thermoplastic interlayers are substantially clear. If the glazing overall exhibits a tint (because either the internal glass sheet of the glazing is tinted throughout or one or more folds of the intermediate layer material is tinted), it preferably has a visible light transmission (measured by the CIE Illuminant A) of less than 40%, more preferably of less than 30% and preferably of less than 25%, and a total energy transmission (Parry Moon, Air Mass 1.5) of less than 30%, more preferably of less than 25% and preferably of less than 20%.

It is understood that the glass sheets can have any composition capable of being used for laminated glazings and in particular for motor vehicle laminated glazings.

Figure 2:
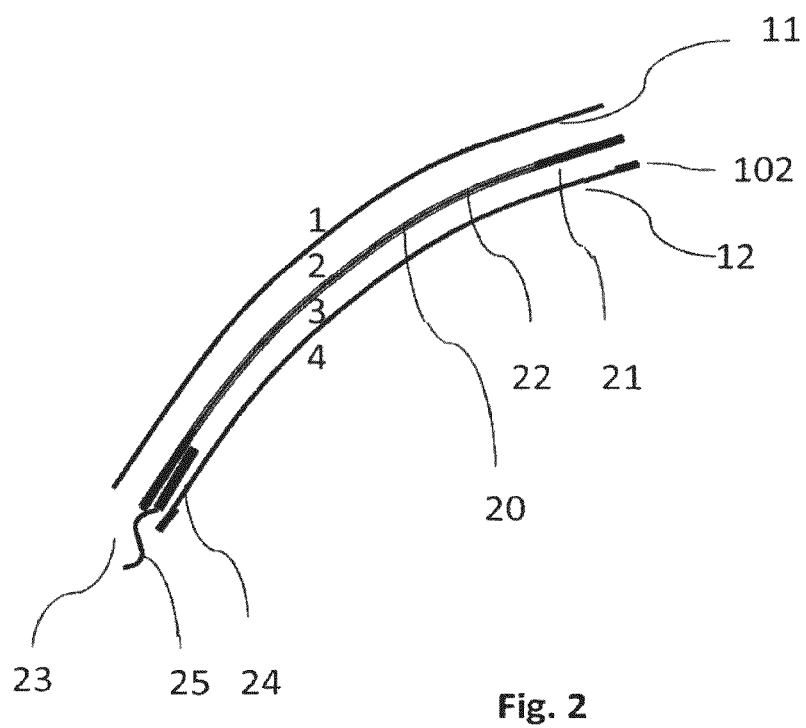
FIG. 2 shows a schematic plan view of a glazing 10 according to the invention comprising a thermoplastic interlayer comprising a zone which is opaque to radiation of the wavelengths of the visible region.
Figure 3:
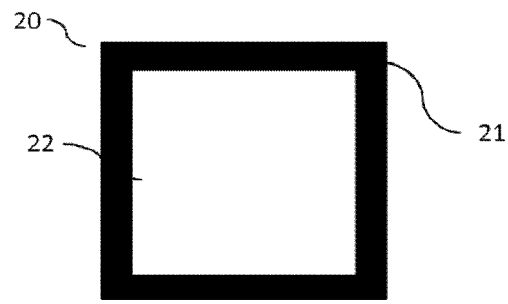
FIG. 3 shows a schematic plan view of a thermoplastic interlayer comprising a zone which is opaque to radiation of the wavelengths of the visible region, said opaque zone framing a nonopaque zone.
Figure 4:
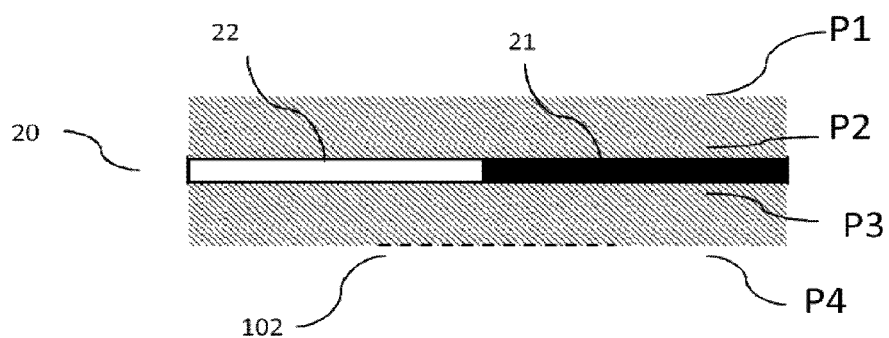
FIG. 4 shows a schematic plan view of a glazing 10 according to the invention comprising an enamel layer comprising dots which is positioned on face 4.

FIG. 2 shows a laminated glazing, more specifically a windshield, according to the invention in which there is provided, on face 2 of the glass sheet 11, a thermoplastic interlayer 20 comprising a zone 21 which is opaque to radiation of the visible region, said opaque zone extending over the entire periphery of a nonopaque zone 22 of the thermoplastic interlayer 20. Such a thermoplastic interlayer is represented in FIG. 3. In contrast to FIG. 1, the face 2 of the external glass sheet 11 is devoid of an enamel layer.

According to this specific embodiment, the opaque zone is formed of a black PVB tinted throughout exhibiting a light transmission of 0%. The nonopaque zone 22 is in this instance represented by a clear PVB and preferably a PVB which blocks UV radiation. Such a PVB is also known as "UV-cut PVB". There is also represented, in FIG. 2, a circuit which conducts electricity 23 formed of a busbar 24 and of connections 25, which is positioned at the periphery of the laminated glazing on face 3. This conducting circuit is well known to a person skilled in the art and its positioning is conventional in this type of glazing. However, it can be positioned on another part of the laminated glazing. The opaque zone 21 provided on the upper and lower peripheral zones of the laminated glazing (orientation according to the top/bottom arrangement of the glazing on the motor vehicle as windshield) has to have dimensions sufficient to conceal in particular the gluing of the upper lip of the upper tightness seal intended to receive the laminated glazing when it is fitted to the motor vehicle and also the gluing of the gutter seal positioned at the lower periphery of the glazing.

According to this specific embodiment of the invention, the thermoplastic interlayer 20 comprising an opaque zone 21, extending over the entire surface of the laminated glazing, said opaque layer for its part extending over the entire periphery of the thermoplastic interlayer 20 and into the camera zone. Thus, as a result of the extension of the thermoplastic interlayer up to the edges of the laminated glazing, this makes it possible to prevent the risk of flaking/removal of the screen printing on face 2 during the trimming of the excess PVB.

Equally, by virtue of the invention, the glitter line is eliminated, since the same thermoplastic interlayer is used both to opacify the zone to be concealed (via the zone which is opaque to radiation of the wavelengths of the visible region) and to make possible the lamination of the two glass sheets, since the thermoplastic interlayer extends over the entire surface of the laminated glazing.

According to a specific embodiment of the invention, only the lower peripheral zone and upper peripheral zone of the laminated glazing are provided with the opaque zone of the interlayer; the lateral zones are provided with strips of screen-printed enamel which are thin, in order to maximize the field of view.

In addition, as shown in FIG. 2, an enamel layer 102 may be present on the face 4 of the glazing, so as to conceal the connections, such as busbars and the connectors, or else the glue making it possible to glue these elements, and the like, seen from the inside of the vehicle.

FIG. 3 shows the at least first thermoplastic interlayer 20 according to a specific embodiment of the invention. The opaque zone 21 is found at the periphery of the thermoplastic interlayer 20. The thermoplastic interlayer 20 is slightly greater in size than the glass sheets 11 and 16, so that it extends over the entire surface of the glass sheets. The opaque zone 21 according to this specific embodiment takes the form of a frame produced from a colored thermoplastic interlayer, the light transmission of which is 0%. In particular, the frame is produced from a black PVB surrounding the nonopaque zone 22 which it is formed of a transparent PVB which screens out UV radiation, allowing only a very small proportion of the latter to pass. For PVB interlayers with a thickness of 0.38 mm, more than 95% of the UV radiation is eliminated. This proportion can exceed 99%. Polymers based on ethylene/vinyl acetate (EVA) are also proposed which include components conferring on them a very low transmission of UV radiation. It is understood that any thermoplastic interlayer exhibiting these characteristics, namely a transmission of less than 5% and preferably equal to 0%, can be used to form this opaque zone. The dimensions of the opaque zone are generally equivalent to those normally used for the occultation strip. These dimensions will depend in particular on the zone to be concealed. Thus, the at least first thermoplastic interlayer as represented by FIG. 2 is formed of a frame of PVB colored throughout positioned on the circumference/periphery of a transparent PVB, so as to form the thermoplastic interlayer according to the invention. It is understood that this frame can be formed by different strips positioned so as to form said frame, these strips fusing during the stoving so as to form a single piece. However, it can be made up and applied using any other known means. The interlayer is subsequently provided on at least the face 2 (P2) of the external glass sheet. It can, of course, also be provided on the face 4 (P4). According to a specific embodiment of the invention as shown, by way of example, in FIG. 4, the continuous enamel layer 102 can be replaced by an enamel strip exhibiting a network of orifices preferably exhibiting a tight uniform distribution of small-sized orifices commonly known as dots.

In this specific embodiment of the invention, the width of the enamel strip exhibiting these dots is between 4 and 30 mm. This enamel strip 102 exhibiting the dots preferably exhibits an overlap between the dots and the zone which is opaque to wavelengths of the visible region 21, the light transmission of which is preferably less than 5% and more preferably 0% of the incident light, of a thermoplastic interlayer 20. Preferably, the enamel strip exhibiting the dots is superposed on the zone which is opaque to wavelengths of the visible region 21, the light transmission of which is preferably less than 5% and more preferably 0% of the incident light, of the thermoplastic interlayer 20, over a distance of between 0 and 10 mm. This overlap is important, in particular for the lateral strips, as the dots on face 4 (commonly known as P4) will not have the same color as the opaque zone of the thermoplastic interlayer and particularly of an opaque zone made of a black PVB, seen from the inside of the vehicle. It is understood that the distance of superposition will be adjusted to each model, according to the distance of visibility from the passenger compartment.

The presence of the enamel strip exhibiting dots instead of a complete enamel strip on face 4 (P4), combined with a thermoplastic interlayer exhibiting, at its periphery, a zone which is opaque to the wavelengths of the visible region 21, the light transmission of which is preferably less than 5% and more preferably 0% of the incident light, makes it possible to use less black strip width on P4. Thus, the presence of the burn line (deformation of the white lines in the bottom part of the windshields) is greatly reduced. This is because the improvement makes it possible to reduce the value from 400 mdpt (millidiopters) to less than 100 mdpt without a low strip of enamel on face 4 (P4). Furthermore, according to this implementation, it is possible to add peripheral bars to the periphery of the face 4 (P4) (which will preferably be gray) and which will act as glue track.

Finally, by virtue of the invention, it is possible to dispense with the use of a primer intended to improve the adhesion of the glue to the glazing or to protect the glue during the application of a glue to a glazing according to the invention in order to attach it to the vehicle. This is because, in the context of the invention, a primerless glue can be used without a concealing and/or protecting element on face 1 if it is protected between the faces 2 and 3 by a thermoplastic interlayer comprising, at its periphery, a zone with a light transmission of 0%. In particular, this is all the truer when this peripheral portion is formed of a black PVB.

Figure 6:
FIG. 6 shows a graph showing the positive effects of the zone which is opaque to radiation of the wavelengths of the visible region of the thermoplastic interlayer on the optical distortion of the image captured by a camera, in comparison with a conventional glazing.

FIG. 6 shows one of the positive effects, with regard to the use of an interlayer according to the invention and in particular with regard to the use of a thermoplastic interlayer, the zone which is opaque to radiation of the wavelengths of the visible region of which extends into the camera zone, on the optical distortion of the image captured by a camera, in comparison with a conventional glazing. With the aim of illustrating the advantages of the invention related to the quality of the images detected by an incorporated camera, two batches of samples were produced and analyzed. The first batch is a batch of conventional windshields formed of two bent glass sheets covered at the periphery and around the camera zone with a layer of enamel on face 4. These windshields exhibit an enamel pattern such as that used conventionally for the incorporation of a camera in the high central zone of the glazing. The second batch is formed of windshields for which the enamel has been replaced by a thermoplastic interlayer composed of a transparent zone and an opaque zone, the zone reproducing the pattern of the enamel as described above, included in this the camera zone. The samples were subsequently analyzed with the aim of quantifying the optical deformation detected through this camera zone. In particular, the glazings were measured using an ISRA Labscan device, the filters of which were adjusted in the following way: Filter 1/2/0—Masking 30/4/4/4. The analysis was carried out for an angle of installation of 28.5°, with respect to the horizontal, and for at least three glazings per batch tested. The mean distortion values measured in millidiopters are presented in the table of FIG. 6, which shows that a lower distortion of the image obtained with the glazings according to the invention (the lower the value, the weaker the distortion), in comparison with the glazings conventionally used (enamel in the camera zone).

A laminated glazing according to the invention can be fitted into any window of a vehicle.

It can particularly and preferably be used as a motor vehicle windshield.

Furthermore, a laminated glazing according to the invention can be provided with an additional functionality, by inclusion of appropriate elements, such as a hydrophilic or hydrophobic coating on face 1 or face 4. For example, laminated glazings, as used as windshield or rear window of a motor vehicle, comprise numerous functionalities, such as the interior rear-view mirror support, busbars making it possible to convey an electric current, an upper strip screening out solar radiation, having a possibly degraded coloring, a rain detector, and the like.

The application of a thermoplastic interlayer 20 comprising an opaque zone 21 to glazings of complex form, such as windshields, is not necessarily limited to the opaque strips concealing the location of the gluing or any other unsightly element. The same technique can be used for installing any decorative or identifying element, whether the latter is opaque or nonopaque.

The thermoplastic interlayer comprising an opaque zone is in particular incorporated in assemblages which shelter it from risks of abrasion or of chemical attack. This is the case in particular with laminated glazings. For the latter, the thermoplastic interlayer comprising an opaque zone is advantageously positioned between the sheets constituting the glazing, whether the latter comprises two glass sheets assembled by means of an interlayer of the PVB type or else whether the glazing is of the bi-layer type, composed of a glass sheet combined with an organic sheet of polyurethane type. The thermoplastic interlayer comprising an opaque zone can also be applied to an "internal" face of multiple glazings. Finally, when just one glass sheet is used, the opaque zone of the thermoplastic interlayer, which would be exposed to risks of mechanical or chemical degradation, can be protected by a protective coating applied either uniformly over the whole of the glazing or locally over the opaque zone.

The invention claimed is:

1. A laminated glazing comprising:
   a first glass sheet and a second glass sheet laminated by means of at least one thermoplastic interlayer,
   an optical sensor positioned on an internal face of the laminated glazing,
   wherein a material of the at least one thermoplastic interlayer comprises a zone Which is opaque to wavelengths of the visible region, said opaque zone extending at least into a zone around the optical sensor,
   wherein the opaque zone also extends over an ent re periphery of at least one of the first class sheet and the second glass sheet and,
   wherein the laminated dazing further comprises, on face 4, an enamel strip comprising dots.

2. The laminated glazing as claimed in claim 1, wherein the optical sensor is chosen from a camera, an infrared camera, a Lidar, and a laser pointer.

3. The laminated glazing as claimed in claim 1, wherein the opaque zone also extends over a periphery of a internal face of the first glass sheet.

4. The laminated glazing as claimed in claim 1, wherein the opaque zone of the at least one thermoplastic interlayer has a light transmission which is less than 5% of the incident light.

5. The laminated glazing as claimed in claim 1, wherein a light transmission of the opaque zone of the at the least one thermoplastic interlayer is 0% of the incident light.

6. The laminated glazing as claimed in claim 1, wherein the at least one thermoplastic interlayer is positioned substantially on a surface of the glazing.

7. The laminated glazing as claimed in claim 1, wherein the at least one thermoplastic interlayer is formed from the opaque zone positioned around a nonopaque zone.

8. The laminated glazing as claimed in claim 1, wherein the at least one thermoplastic interlayer is a sheet of polyvinyl butyral or of ethylene/vinyl acetate.

9. The laminated glazing as claimed in claim 1, wherein the opaque zone is obtained by a bulk coloring of a periphery of the interlayer.

10. The laminated glazing as claimed in claim 1, wherein the enamel strip overlaps the opaque zone over at least a portion.

11. The laminated glazing as claimed in claim 1, wherein the enamel strip overlaps the opaque zone over a distance of between 4 and 30 mm.

12. The laminated glazing as claimed in claim 1 wherein the glazing is a windshield for a motor vehicle.

13. A laminated glazing comprising:
   a first glass sheet and a second glass sheet laminated by means of at least one thermoplastic interlayer,
   an optical sensor positioned on an internal face of the laminated glazing,
   wherein a material of the at least one thermoplastic interlayer comprises a zone which is opaque to wavelengths of the visible region, said opaque zone extending at least into a zone around the optical sensor,
   wherein the opaque zone extends over lower and upper edges of the laminated glazing and,
   wherein the laminated glazing further comprises, on face 4, an enamel strip comprising dots.

14. The laminated glazing as claimed in claim 13, wherein the optical sensor is chosen from a camera, an infrared camera, a Lidar, and a laser pointer.

15. The laminated glazing as claimed in claim 13, wherein the opaque zone of the at least one thermoplastic interlayer has a light transmission which is less than 5% of the incident light.

16. The laminated glazing as claimed in claim 13, wherein the opaque zone of the at least one thermoplastic interlayer has a light transmission that is 0% of the incident light.

* * * * *